Jan. 14, 1969  L. A. COLE  3,421,480
DISINFECTING APPARATUS
Filed Nov. 28, 1966  Sheet 1 of 2
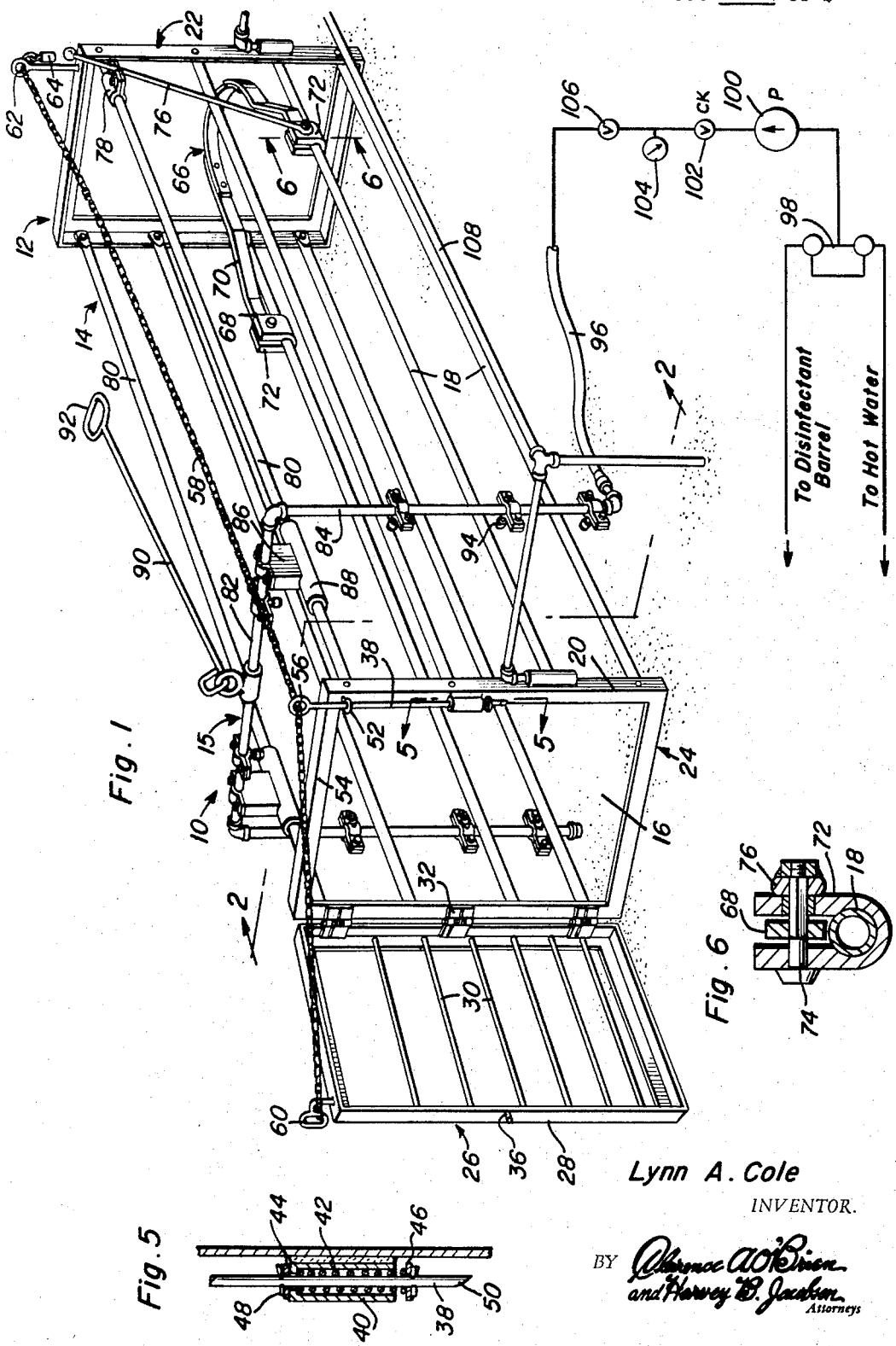
Lynn A. Cole
INVENTOR.

Jan. 14, 1969    L. A. COLE    3,421,480
DISINFECTING APPARATUS
Filed Nov. 28, 1966
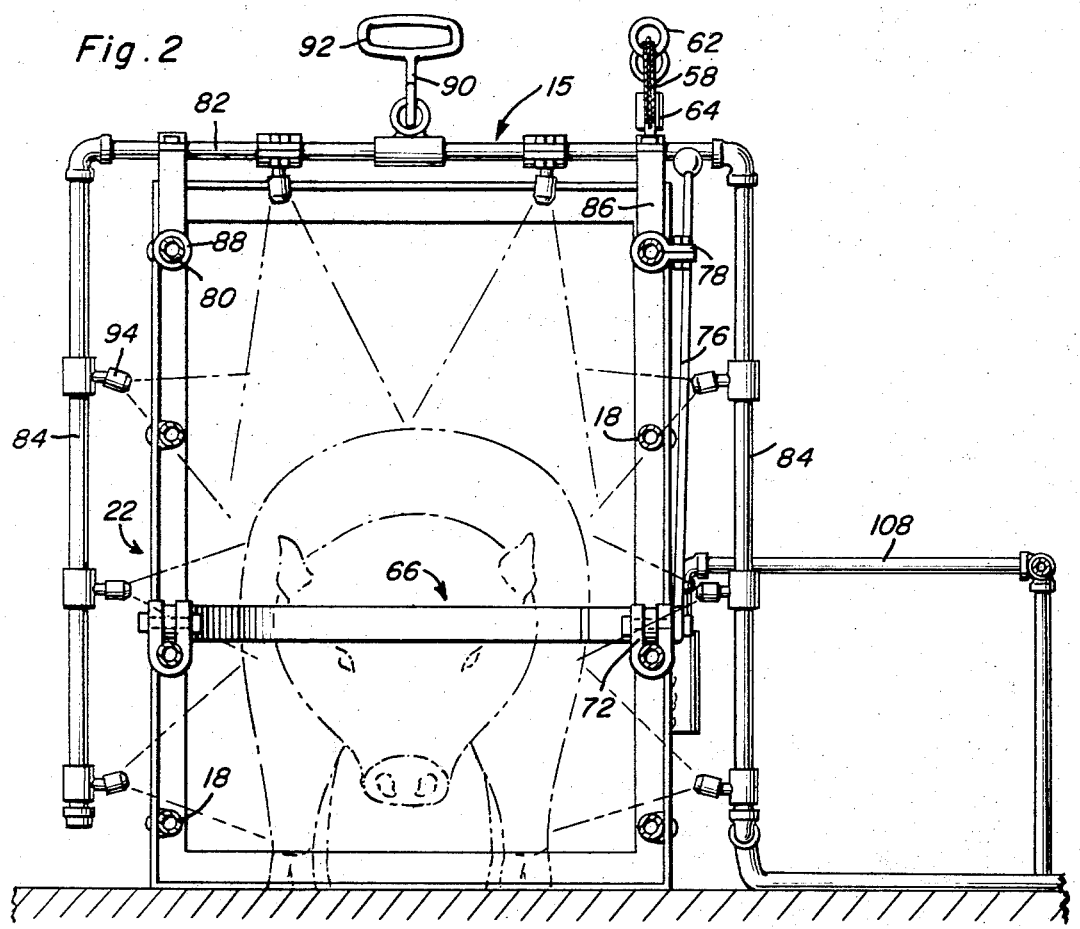
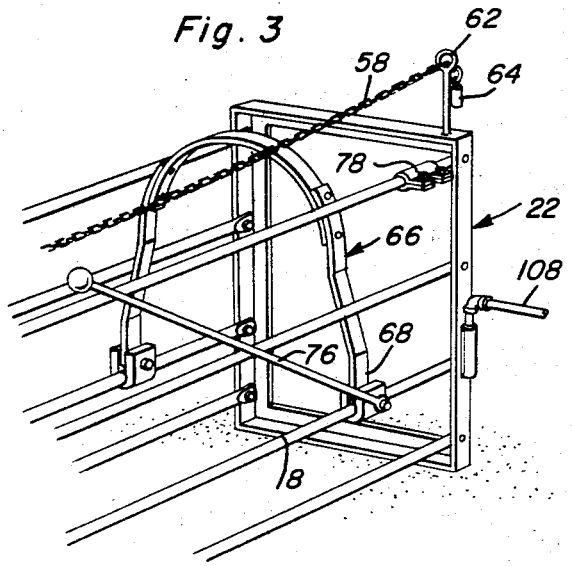
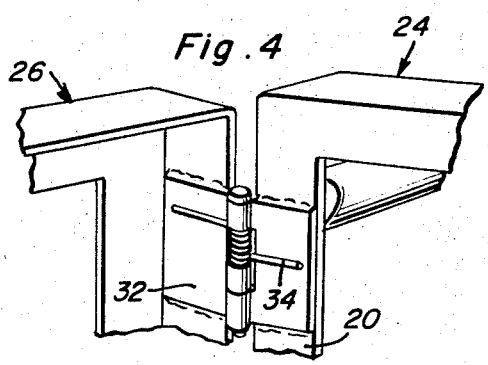
Lynn A. Cole
INVENTOR.

United States Patent Office 3,421,480
Patented Jan. 14, 1969

3,421,480
DISINFECTING APPARATUS
Lynn A. Cole, R.F.D. 1, Mount Blanchard, Ohio 45867
Filed Nov. 28, 1966, Ser. No. 597,314
U.S. Cl. 119—159                               8 Claims
Int. Cl. A01k 29/00

ABSTRACT OF THE DISCLOSURE

Apparatus for use in disinfecting animals comprising a pen-like enclosure having laterally spaced walls and opposed selectively closed ends for confining an animal between the walls. Each of the walls includes a guide rail along the top thereof for the support of a U-shaped spray unit which travels along the walls and discharges disinfectant inward on a retained animal. The exit end of the enclosure is selectively opened and closed by means of an elongated flexible member controlled from the entrance end of the enclosure.

---

The instant invention is generally concerned with disinfecting apparatus for animals, and more specifically relates to a device or unit particularly adapted for expeditiously cleaning and disinfecting sows prior to entering farrowing quarters.

It is a primary object of the instant invention to provide a unit which is uniquely adapted to effect a thorough cleaning and disinfecting of an animal through the confining of the animal in a pen-like enclosure and the subjecting of the animal to a suitable cleansing and disinfecting spray.

In conjunction with the above object, it is a significant object of the instant invention to provide a retaining pen structure wherein the selective confining and subsequent release of the animal can be rapidly and easily effected in a manner which enables the processing of the animals with minimum delay, discomfort to the animal, and effort on the part of the operator of the device.

Likewise, a significant object of the instant invention resides in the provision of a disinfecting device wherein a manipulation of the entire apparatus, including the spray unit, can be effected from one end of the animal confining pen.

Furthermore, it is a significant intention of the instant invention to provide disinfecting apparatus incorporating a movable spraying unit which can be manipulated so as to direct the spray as desired should, as an example, a more thorough spraying of selected portions of the animals be required.

In addition, it is an important object of the instant invention to provide apparatus which is of relatively simple construction and at the same time of a highly rigid nature capable of continuous efficient operation in the processing of the animals.

Basically, in achieving the above objects, it is contemplated that the apparatus of the instant invention include a pen-like enclosure defined by opposed elongated wall units which form an elongated open-ended passage. The wall units are to be constructed of vertically spaced bars or rods with the upper pair of bars constituting guide rails for a U-shaped spray unit mounted thereon and slidable therealong. The spray unit is to include a hollow fluid conveying pipe horizontally overlying the passage and terminating in opposed vertically directed side portions which overlie the outer sides of the wall units. A plurality of inwardly directed spray nozzles are to be mounted on the spray pipe along the full length thereof, these nozzles discharging the pipe carried disinfectant inwardly toward the passage as the entire spray apparatus is moved forward and backward along the two upper guide rails. The sow, upon being introduced into the wall-defining passage, is to be confined therein by a restraining band selectively lowered behind the animal, and an exit gate selectively closed on the exit end of the passage. Both the restraining band and the gate are to be manipulated from the entry end of the pen, as is the movement of the spray unit. In this manner, one person can close the gate, introduce the sow into the passage, position the restraining band, and manipulate the spray unit along the length of the animal. Subsequent to the completion of the spraying, the exit gate can be opened and the animal allowed to exit. The exit gate can then be closed, the restraining band lifted, and another animal moved into the pen for the repetition of the operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the apparatus of the instant invention with a schematic flow diagram of the feeding means for the spray unit being illustrated in conjunction therewith;

FIGURE 2 is an enlarged cross-sectional view taken substantially on a plane passing along line 2—2 in FIGURE 1;

FIGURE 3 is a partial perspective view of the entry end of the apparatus with the restraining band lifted;

FIGURE 4 is an enlarged perspective view of one of the spring-biased hinges of the exit door which enables an automatic opening of the door upon a release of the latch;

FIGURE 5 is an enlarged cross-sectional detail taken substantially on a plane passing along line 5—5 in FIGURE 1; and FIGURE 6 is an enlarged cross-sectional detail taken substantially on a plane passing along line 6—6 in FIGURE 1.

Referring now more specifically to the drawings, reference numeral 10 has been used to generally designate the apparatus comprising the instant invention. This apparatus consists basically of an enlarged animal receiving and confining pen 12, and a spray unit 15 operatively mounted thereon.

The animal confining pen 12 includes a pair of laterally spaced wall units 14 defining an open-ended elongated passaged 16 therebetween. Each of the wall units comprises a plurality of vertically spaced horizontal pipes, bars or rods 18, the opposite ends of which are rigidly affixed as by bolting or welding, to the vertical side members 20 of a pair of rectangular frames 22 and 24 which form the entry and exit ends for the passage 16. As will be noted, the vertically spaced bars 18 which form the side wall units 14 are so spaced as to allow a substantial unblocked viewing of the interior of the pen 12 while effectively confining the animal therein. The end frames 22 and 24 are preferably formed of angle iron whereby a smooth outer face can be provided with the opposite ends of the bars 18 internally affixed in a manner so as to leave no exposed edges.

The exit end of the passage 16, defined by the rectangular frame 24, is to be selectively closed by a pivotally mounted gate or door 26 formed of a rectangular frame 28 and a plurality of transversely extending vertically spaced rigid rods 30 which also allow for free viewing into the pen 12 while restricting the movement of the animal therefrom. The gate 26 is mounted on exit frame side member 20 by a plurality of hinges 32, these hinges 32, as will be best noted from FIGURE 4, incorporating spring means 34 which act so as to bias the gate 26 toward the open position illustrated in FIGURE 1, thus allowing free passage of the animal from the pen 12. This spring means, in the illustrated form of the invention, comprises a coiled spring wound about the hinge pintle and having the opposite extremities thereof engaged against the opposed leaves of the hinge 32, thereby pivotally biasing these hinge leaves away from each other.

The gate 26 is to be retained in a closed position by means of a latch assembly which includes a rigid latch bolt 36 fixed to the door frame 28 and releasably retained behind a vertically retractable keeper rod 38 mounted on the front or outer face of the opening frame 24. The keeper rod 38 is received through a vertically elongated hollow sleeve 40 welded to the upright 20 of the frame 24 and is biased downwardly relative thereto by an internally mounted compression coil spring 42 received about the rod 38 and abutting, at the upper end thereof, the upper or inner restricted end 44 of the sleeve 40, and at the lower end thereof, a washer-like collar 46 fixed about the keeper rod 38 below the sleeve 40. Downward movement of the keeper rod 38 is limited by a suitable stop 48 fixed about the rod 38 above the mounting sleeve 40 with the stops or collars 46 and 48 being so spaced as to allow for the desired vertical movement of the keeper rod 38 in securing and releasing the latch bolt 36. The forward face of the lower end of the keeper rod 38 is beveled as at 50 so as to allow for an automatic upward riding of the keeper rod 38 upon an engagement of the latch bolt 36 thereagainst as the gate 26 is closed, the keeper rod immediately being moved downward by the spring 42 upon a movement of the latch bolt 36 inward thereof, the keeper rod 38 being positioned outwardly from the forward face of the frame upright 20 a sufficient distance so as to allow for the accommodation of the latch bolt 36 therebehind.

With reference to FIGURE 1, it will be noted that the keeper rod 38 extends vertically along the frame upright 20 through an upper guiding eyebolt 52, and upward beyond the upper horizontal member 54 of the frame 24 where it terminates in an enlarged control member receiving eye 56. This eye 56 receives an elongated control chain 58 or the like therethrough with the forward end of the chain being fixed to a suitable mount 60 secured to the door frame 28 and projecting vertically thereabove adjacent the free edge of the frame 28. The opposite or rear end of the chain 58 is received through a similar eye-defining mount 62 affixed to the horizontal upper member of the rear frame 22. An enlarged stop 64 is affixed to the extreme rear end of the chain 58 beyond the mount 62 so as to prevent a movement of the chain 58 forward and out of the eye of the mount 62. It is through this chain 58 that the release of the keeper rod 38, as well as the opening and closing of the gate 26, is controlled. Thus, assuming the gate 26 is closed, it will be recognized that an upward pull on the chain 58, from the rear thereof, will result in a raising of the keeper rod 38 sufficiently so as to allow for a release of the gate mounted latch bolt 36, at which time, the hinge mounted springs 34 will immediately swing the gate 26 open, the stop 64 constituting a limit to the opening of the gate. By the same token, when closing the gate 26, one need merely pull on the chain 58, thereby effecting an inward swinging of the gate 26 for an engagement of the latch bolt 36 behind the lower portion of the keeper rod 38.

In order to restrain the animal at the entry end of the pen 12, an arcuate vertically swingable restraining band 66 is provided. This band 66 has the forward ends 68 of the side legs 70 thereof received between opposed ears on a pair of mounting brackets 72 affixed to an opposed pair of wall unit bars 18. Within each of the brackets 72, the corresponding band end 68 is affixed to a rotatably mounted pin 74, one of these pins having a rigid elongated control rod or handle 76 secured thereto whereby a positive swinging of the restraining band 66 can be effected. FIGURE 6 is of interest in illustrating one manner of securing the control handle 76 to one band mounting pin 74 whereby a rotating of the handle 76 will result in a corresponding rotation of the pin 74 and the band 66 secured thereto. The upper end of the control handle 76 is, when the restraining band 66 is lowered to a horizontal orientation for positioning behind the animal, releasably received within a notched keeper 78 affixed to the top bar of the corresponding wall unit 14. The control rod 76 will possess a slight degree of lateral flexibility so as to allow for its ready engagement into and disengagement from the keeper 78 in an obvious manner. FIGURE 3 illustrates the restraining band 66 in its vertically swung retracted or animal passing position.

The top bar of each of the wall units 14 provides an additional and highly significant function in defining a guide rail, hereinafter referred to by reference numeral 80, upon which the spray unit 15 is to be mounted and guided. The spray unit 15 includes a generally U-shaped pipe having a central elongated portion 82 extending transversely across the pen defining passage above the upper guide rails 80, and two depending side portions 84 in fluid passing communication with the opposite ends of the center portion 82, the side portions 84 extending to a point just above the ground. The center portion 82 of the pipe is affixed, through a pair of vertical mounting blocks 86, to a pair of sleeve-like bushings 88 slidably received on the two top rails 80 for movement along the length of the pen 12. The actual movement of the spray unit 15 is effected through an elongated control handle 90 pivotally affixed to the center of the central pipe section 82 and extending rearwardly therefrom toward an integral handgrip 92 which can be easily grasped for a reciprocal movement of the spray unit pipe longitudinally along the pen 12. It will be noted that the control handle 90 extends rearwardly toward the rear of the pen 12 for manipulation therefrom. When the handle 90 is not in use, it can merely lie atop one of the adjacent top guide rails 80.

The cleansing and/or disinfectant fluid to be sprayed will be discharged from the spray unit pipe at spaced points therealong through suiable spray nozzles 94 mounted on the pipe sections 82 and 84 and inwardly directed relative to the internal pen passage 16 through the open wall units 14. The appropriate solution or solutions will be supplied to the spray unit pipe through an elongated supply line 96 provided with an appropriate valve unit 98, pump 100, check valve 102, pressure gauge 104 and shutoff valve 106 as needed for a complete controlling of the dispensing of the fluid.

Finally, if deemed desirable, an appropriate guard rail 108 can be provided along one side of the animal pen 12 for the protection of the supply hose 96 which will necessarily move back and forth along the ground as the spray assembly 15 is longitudinally reciprocated during the cleansing and disinfecting operation.

In use, the gate 26 will initially be closed through a pull on the chain 58. This chain 58, incidentally, can in fact be any appropriate type of elongated flexible member such as a rope or cable. Next, the animal, normally a sow, will be positioned in the passage 16 through the entry-defining frame 22, after which the restraining band 66 will be lowered behind the animal and the band control handle 76 locked within the notched keeper 78. At this point, the feed line shutoff valve 106 will be turned on and the spray discharged through the plurality of discharge nozzles 94 as the spray unit pipe is reciprocally moved longitudinally along the two top rails 80. As will be appreciated from FIGURE 2, the spray will be introduced both through both sides and the top of the pen 12 so as to produce what amounts to a curtain of spray enabling a complete coverage of the animal, as well as a concentration of the spray at particular portions of the animal, upon a movement of the spray assembly 15 along the pen 12. After the spraying of the animal is completed, the front gate 26, closing the exit end of the passage 16, will be opened through a pull on the chain 58 and through the action of the biasing hinge mounted springs 34, thus allowing for a free passage of the animal from the pen 12 which, through a repetition of the above steps, will receive and process a second animal. As will be appreciated from the above, the entire disinfecting procedure can be easily controlled by one person from one end of the apparatus 10, thereby resulting in a highly efficient operation which, in conjunction with the basic simplicity of the structure, is considered to constitute a major advance in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Animal disinfecting apparatus comprising a pair of laterally spaced wall units defining an animal receiving passage therebetween, said passage being open at the opposite ends thereof to define an animal entrance at one end of the passage and an animal exit at the second end of the passage, means for selectively restraining an animal in said passage, a disinfectant spraying unit in spray introducing relation to said passage, means mounting said spraying unit for movement along said passage while retaining a spray introducing relation therewith, said spraying unit including a fluid conveying pipe having an intermediate portion extending transversely across said passage in a raised position relative thereto and two end portions depending vertically from the opposite ends of said intermediate portion adjacent the two wall units, and spray discharge means in said pipe along the intermediate and end portions thereof, said spray discharge means being inwardly directed relative to said passage, said means mounting said spraying unit for movement comprising elongated rail means on each wall unit, and a pair of carrying members fixed to said fluid conveying pipe and slidably engaged with said rail means, gate means for selectively closing the second end of said passage, means mounting said gate means for movement between an open and a closed position, means for maintaining said gate means in said open position, means for maintaining said gate means in said closed position, said means for maintaining said gate means in said open position comprising resilient biasing means for automatically moving said gate means to said open position upon a release of said means for maintaining said gate means in said closed position, and an elongate control means engaged with said gate means and said means for maintaining said gate means in said closed position for selectively closing said gate means and releasing said means for maintaining said gate means closed.

2. The apparatus of claim 1 including a restraining band, means mounting said band for selective positioning across said passage adjacent the first end of said passage for the restraining of an animal within said passage.

3. Animal disinfecting apparatus comprising a pair of laterally spaced wall units defining an animal receiving passage therebetween, means for selectively opening and closing the first and second ends of said passage for the restraining of an animal therein, controls for said means both operative from the first end of said passage, spray means mounted on at least one of said wall units and directed inwardly toward said passage, means mounting said spray means on said wall units for controlled movement longitudinally therealong, said means for selectively opening and closing the first end of said passage comprising an elongated arcuate restraining band traversing said passage, the opposite ends of said band being pivotally secured to said wall units for a swinging of said band between a vertical overhead position allowing free movement therebeneath and a horizontal mid-height position preventing movement therepast, said means for selectively opening and closing said second end of said passage comprising a gate pivotally mounted for movement between an opened and a closed position, latch means for selectively retaining said gate closed, and means for biasing said gate open upon a release of said latch means, said latch means comprising a vertically movable keeper rod mounted on one wall unit and a latch pin on said gate selectively engageable therebehind, the control for said gate comprising an elongated flexible member engageable with said keeper rod for a selective raising thereof so as to release said latch pin for an opening of said gate by said biasing means, said flexible member being fixed to said gate longitudinally movable for effecting a pivotal closing of said gate.

4. The apparatus of claim 1 wherein said carrying members comprise a pair of cylindrical sleeves, and a control member secured to said fluid conveying pipe through which the movement of said pipe can be effected.

5. Animal disinfecting apparatus comprising a pair of laterally spaced wall units defining an animal receiving passage therebetween, said passage being open at the opposite ends thereof to define an animal entrance at one end of the passage and an animal exit at the second end of the passage, means for selectively restraining an animal in said passage, a disinfectant spraying unit in spray introducing relation to said passage, means mounting said spray unit for movement along said passage while retaining a spray introducing relation therewith, gate means for selectively closing the second end of said passage, means mounting said gate means for movement between an open and a closed position, means for maintaining said gate means in said open position, means for maintaining said gate means in said closed position, and an elongate control means engaged with said gate means and said means for maintaining said gate means in said closed position for selectively closing said gate means and releasing said means for maintaining said gate means closed.

6. The apparatus of claim 5 wherein said means for maintaining said gate means in said open position comprises resilient biasing means for automatically moving said gate means to said open position upon a release of said means for maintaining said gate means in said closed position.

7. The apparatus of claim 6 wherein the means for maintaining said gate means in said closed position comprises a vertically movable keeper rod mounted on one wall unit and a latch pin on said gate means selectively engageable therebehind, the elongate control means comprising a flexible member engageable with said keeper rod for a selective raising thereof so as to release said latch pin for an opening of the gate by said biasing means.

8. Animal disinfecting apparatus comprising a pair of laterally spaced wall units defining an animal receiving passage therebetween, said passage being open at the opposite ends thereof to define an animal entrance at one end of the passage and an animal exit at the second end of the passage, means for selectively restraining an animal in said passage, a disinfectant spraying unit in spray introducing relation to said passage, means mounting said spraying unit for movement along said passage while retaining a spray introducing relation therewith, said spray unit including a fluid conveying pipe having an intermediate portion extending transversely across said passage in a raised position relative thereto and two end portions depending vertically from the opposite ends of said intermediate portion adjacent the two wall units, and spray discharge means in said pipe along the intermediate and end portions thereof, said spray discharge means being inwardly directed relative to said passage, each of said wall units including a plurality of vertically spaced horizontally elongated retaining bars, the upper bar on each wall unit constituting a carrying rail for said spraying unit, said means mounting said spray unit for movement along said passage comprising a pair of cylindrical sleeves fixed to the intermediate portion of said spraying unit and slidably engaging the wall unit rails, a control member secured to said fluid conveying pipe through which the movement of said pipe can be effected, and fluid introducing means communicated with said fluid conveying pipe through one of said end portions.

References Cited

UNITED STATES PATENTS

| | | | |
|---|---|---|---|
| 868,029 | 10/1907 | Stitzer | 119—15.5 |
| 883,132 | 3/1908 | Goff | 119—159 |
| 2,276,500 | 3/1942 | Maddox | 119—15.5 |
| 2,600,602 | 6/1952 | Abildgaard | 119—159 |
| 3,167,053 | 1/1965 | McDaniel | 119—98 |

HUGH R. CHAMBLEE, *Primary Examiner.*